G. H. BARSCHOW.
WHEEL CARRYING MEANS FOR VEHICLES.
APPLICATION FILED DEC. 13, 1912.
1,098,080.
Patented May 26, 1914.
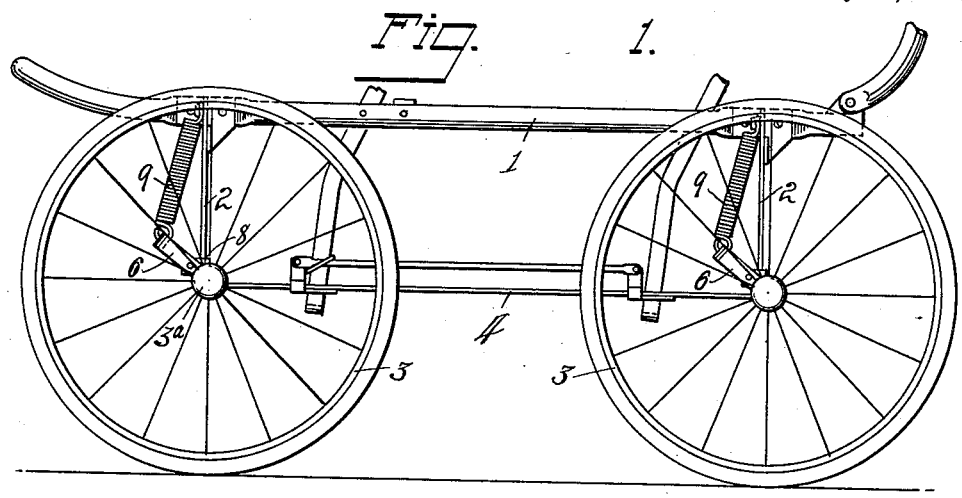
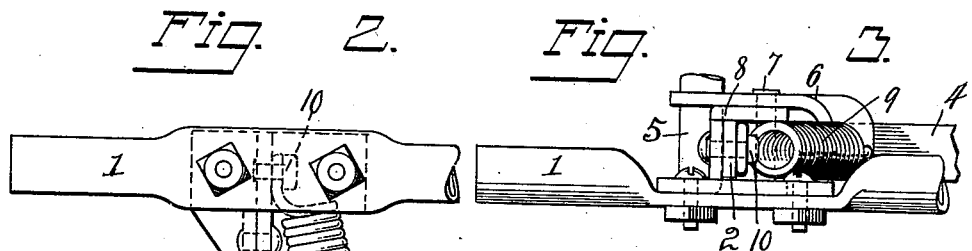
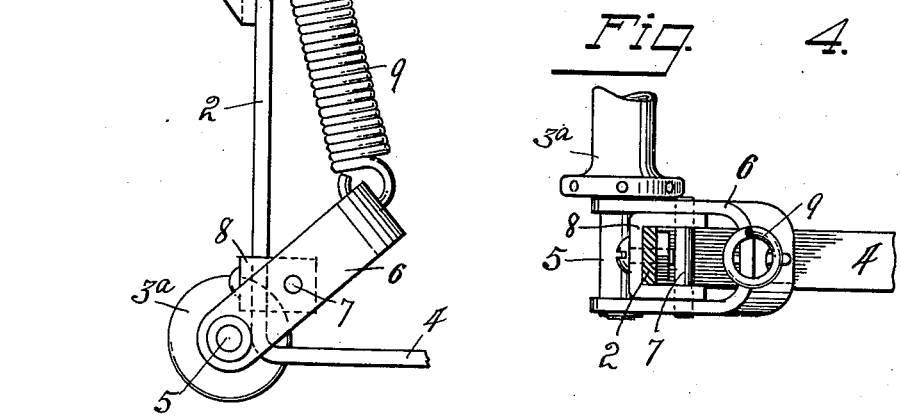
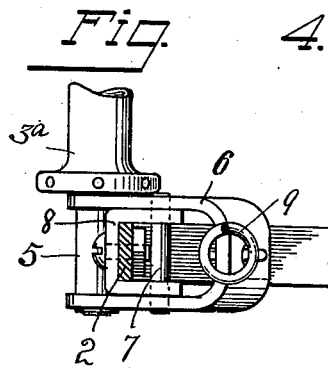
WITNESSES:
C. H. Bills.
F. E. Aul.
INVENTOR.
George H Barschow,
By Owen & Owen,
His attys.

UNITED STATES PATENT OFFICE.

GEORGE H. BARSCHOW, OF TOLEDO, OHIO, ASSIGNOR TO THE AMERICAN METAL WHEEL & AUTO COMPANY, OF TOLEDO, OHIO, A CORPORATION OF OHIO.

WHEEL-CARRYING MEANS FOR VEHICLES.

1,098,080. Specification of Letters Patent. Patented May 26, 1914.

Application filed December 13, 1912. Serial No. 736,626.

*To all whom it may concern:*

Be it known that I, GEORGE H. BARSCHOW, a citizen of the United States, and a resident of Toledo, in the county of Lucas and State of Ohio, have invented a certain new and useful Wheel-Carrying Means for Vehicles; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to means for yieldingly connecting the body frame of gocarts, velocipedes, tricycles, and other vehicles for which it may be adapted or appropriate, to the supporting wheels thereof.

The object of my invention is the provision of means of this character, which is simple, cheap and strong in its construction, efficient in its operation, and adapted to permit the several wheels of a vehicle to yieldingly move relative to each other and to the vehicle frame as the unevenness of the surface passed over may require without materially disturbing the equilibrium of the frame, as would otherwise be the case if a wheel were to pass over an obstruction or drop into a depression in its path, thus very largely eliminating the objections incident to the riding qualities of vehicles of this character.

The invention is fully described in the following specification, and while, in its broader aspect, it is capable of embodiment in numerous forms, a preferred embodiment thereof is illustrated in the accompanying drawings, in which,—

Figure 1 is a side elevation of the running gear of a folding gocart equipped with the invention, and Figs. 2, 3 and 4 are different enlarged details of the frame comprising the invention and the associated parts.

Referring to the drawings, 1 designates, in the present instance, the frame of the gocart, but may constitute the frame or body of any other vehicle in connection with which the invention may be used. Standards 2 depend, in the present instance, from opposite sides of the frame 1 in proper position for attaching at their lower ends to the axles of the front and rear wheels 3, and the standards 2 at the same side of the frame are shown as connected by reach rods 4.

The hub $3^a$ of each wheel which it is desired to carry for yielding movements relative to the frame, is mounted on a stub axle or pintle 5, that is fixed at one end to an end of a lever carrying member 6. The member 6, in the present instance, is of U-form to enable it to straddle the standard 2 by which it is carried, and the legs thereof are connected adjacent to their middle by a fulcrum pin 7, which has a bearing in a part of the standard. The bearing for the fulcrum pin may constitute a U-shape part 8, which straddles the standard between the legs of the lever member 6 and has its looped portion bolted to the standard and its legs forming a double bearing for the pin.

The stub-axle 5 is preferably carried by the open end of the lever member 6, being attached to both legs thereof with its axis parallel to the lever axis, while the closed or looped end of said member is yieldingly connected to the frame 1, or to a part of the standard 2, to resist relative inward movements of the wheel and frame. This yielding connection, in the present instance, comprises a coiled contractile spring 9, which attaches at one end of the lever member 6 and at its other end to a pin or bolt 10 projecting from the upper end portion of the standard 2. The lever member 6 normally assumes an inclined position with the stub-axle 5 in contact with the lower end of the standard 2 to limit the degree of inclination.

It is thus evident that the wheels of the vehicle are permitted to have vertical movements relative to each other and to the frame to accommodate themselves to the unevenness of a surface over which they are passing, and at the same time provides a very efficient spring support for the vehicle frame, whereby to materially improve the riding qualities thereof.

I wish it understood that my invention is not limited to any specific construction or arrangement of the parts thereof, or to use in connection with any particular type of vehicle, except in so far as such limitations are specified in the claim.

Having thus described my invention, what I claim as new, and desire to secure by Letters Patent, is,—

In combination, a vertically disposed frame part, a U-shape bearing member fixed to and straddling a portion of said frame part, a lever having a two point fulcrum bearing on said member and mounted for vertical oscillatory movements with its outer ends disposed at opposite sides of said part, a spring connecting one end of said member to said frame part and normally maintaining the opposite end of the lever in lowered position relative to said part, a stub-axle fixed to the lowered end of said lever, and a supporting wheel carried by said stub-axle.

In testimony whereof, I have hereunto signed my name to this specification in the presence of two subscribing witnesses.

GEORGE H. BARSCHOW.

Witnesses:
S. T. KLOTZ,
F. E. AUL.

Copies of this patent may be obtained for five cents each, by addressing the "Commissioner of Patents, Washington, D. C."